United States Patent [19]

Chato

[11] Patent Number: 4,891,976
[45] Date of Patent: Jan. 9, 1990

[54] DEVICE EMPLOYING RESONANT CHAMBERS TO DETERMINE WIND CHARACTERISTICS

[76] Inventor: John D. Chato, 1412-1450 Chestnut St., Vancouver, B.C., Canada, V6J-3K3

[21] Appl. No.: 178,914
[22] Filed: Apr. 7, 1988
[51] Int. Cl.⁴ .............................................. G01W 1/04
[52] U.S. Cl. ................................... 73/189; 73/861.18; 73/170 R; 340/601
[58] Field of Search ............. 340/968, 601; 73/170 R, 73/189, 188, 861.18

[56] References Cited

U.S. PATENT DOCUMENTS 2,492,371 12/1949 Sivian ................................ 73/861.21
3,748,502 7/1973 Bernstein .......................... 73/861.18

Primary Examiner—Joseph A. Orsino
Assistant Examiner—Hollis T. Chen
Attorney, Agent, or Firm—Sim & McBurney

[57] ABSTRACT

An apparatus for determining wind characteristics, including compass direction and inclination to the horizontal, includes a hemispherical frame on which a plurality of resonant chambers are mounted, defined by tubes with axes passing through the center of curvature of the hemisphere. One end of each tube is closed, and the end toward the center of curvature is open. Wind blowing across openings appropriately orientated will cause air within the chamber to resonate and create a sound. Each tube has a sound detecting unit for producing a signal when the chamber is resonating, and a computer receives the signals and determines from them the direction of the wind.

9 Claims, 1 Drawing Sheet

DEVICE EMPLOYING RESONANT CHAMBERS TO DETERMINE WIND CHARACTERISTICS

This invention relates to apparatus adapted to determine what is called "wind shear". Essentially, this means the true direction of the wind, which includes not only the compass direction but also the angle of inclination to a horizontal plane.

BACKGROUND OF THIS INVENTION

It is very important for airport control towers to known not only the compass direction of the wind on the landing strips, but also the "wind shear", meaning whether the wind has a downward component or an upward component, and the angle of that component. When the wind is blowing other than strictly parallel to the ground surface, it is essential for pilots of incoming and outgoing aircraft, as well as control tower personnel, to know the angle of the inclination.

Heretofore, no reliable apparatus has been devised for determining this wind shear.

GENERAL DESCRIPTION OF THIS INVENTION

Accordingly, it is a general aim of this invention to provide an apparatus for determining wind characteristics, comprising:
frame means,
means defining a plurality of resonant chambers, each with a mouth opening such that wind blowing across the opening at an appropriate speed and direction causes air within the respective chamber to resonate and create a sound, the chambers and mouth openings being at different angles and orientations so as to correspond to hemispherical radii distributed at intervals no greater than about 10°,
a sound detecting unit associated with each resonant chamber and producing a signal when its respective chamber is resonating,
and interpretative means for continuously sampling the output from all said sound detecting units, and for calculating from said sampled outputs the compass direction, the inclination to the horizontal and the speed range of the wind.

Further, this invention provides a method for determining wind characteristics, comprising the steps:
(a) providing an apparatus including:
frame means, and
means defining a plurality of resonant chambers, each with a mouth opening such that wind blowing across the opening at an appropriate speed and direction causes air within the respective chamber to resonate and create a sound, the chambers and mouth openings being at different angles and orientations so as to correspond to hemispherical radii distributed at intervals no greater than about 10°,
(b) placing the apparatus in a wind stream such that certain of the resonant chambers begin to resonate and create sound due to the passage of wind across the respective mouths at appropriate angles,
(c) detecting the generation of sound in the resonating chambers, and
(d) on the basis of such sound detection, computing, on the basis of those chambers actually producing a sound, the position and orientation of a hypothetical plane located such that the sum of the distances of the plane from all sounding chambers is the least, and further calculating, (1) the compass direction of the wind as that of a perpendicular line from the center of the hypothetical hemisphere to the hypothetical plane, (2) the inclination of said line to a horizontal plane as the inclination of the wind to a horizontal plane, and (3) the wind speed range as a function of the perpendicular distance from the center of the hypothetical hemisphere to the hypothetical plane.

GENERAL DESCRIPTION OF THE DRAWINGS

One embodiment of this invention is illustrated in the accompanying drawings, in which like numerals denote like parts throughout the several views, and in which:

FIG. 1 is a partial, schematic view of an apparatus constructed in accordance with this invention; and FIG. 2 is a partial view, to a larger scale, of one of the resonating chambers of the apparatus, constructed in accordance with this invention.

DETAILED DESCRIPTION OF THE DRAWINGS

Figure 1:
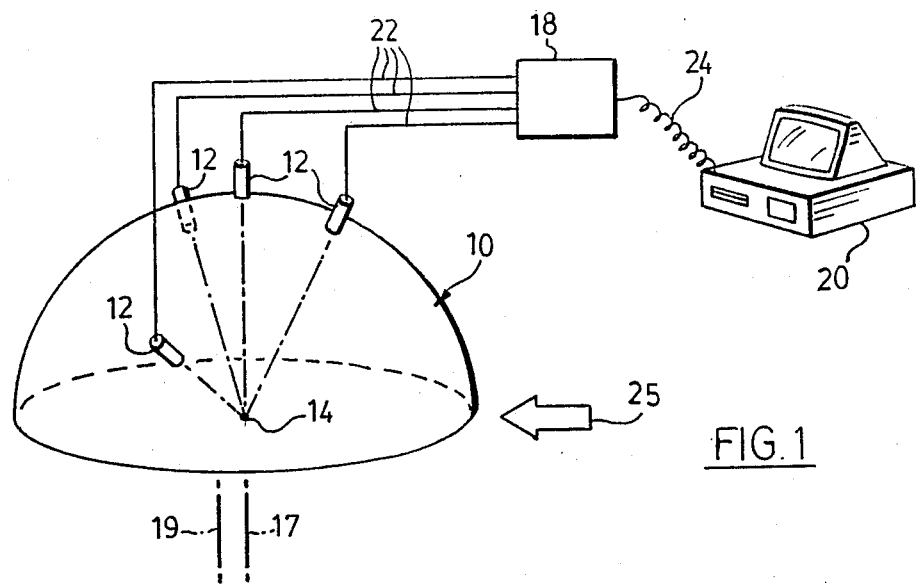
Figure 2:
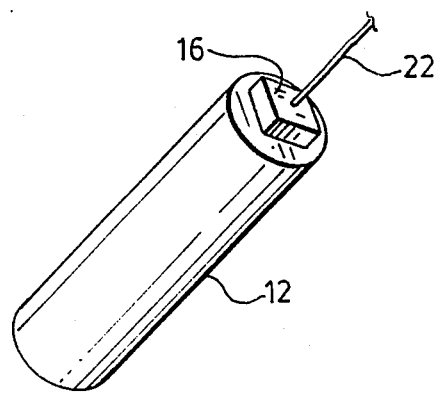

Attention is directed to FIGS. 1 and 2, which show a frame 10 on which are mounted, at spaced intervals, a plurality of resonant chambers defined by tubes 12.

In FIG. 1, only four of the tubes 12 have been drawn in order to void cluttering the drawing. However, it will be understood that the tubes 12 are mounted in a generally distributed manner around the entire surface of the hemispherical frame 10, at intervals no greater than the equivalent of 10° of the hemisphere.

The tubes 12 are closed at the outer end, i.e. the end away from the center 14 of the hemispherical frame 10, and have their other ends open, such that wind blowing across the opening at an appropriate speed and direction will cause air within the tube to resonate and create a sound. As particularly well seen in FIG. 1, the tubes 12 are all oriented in such a way that their axes pass through the hypothetical center 12 of the hemispherical frame 10.

Mounted inside or in association with each resonant chamber defined by a tube 12 is a sound detecting unit 16, which is adapted to produce a signal when its respective chamber is resonating.

the invention also includes interpretative means, preferably computer means, for receiving all signals from the tubes 12 and determining therefrom the directional characteristics of the wind. In FIG. 1, the interpretative means includes a converter 18 and a microcomputer 20. The converter 18 receives the individual signal lines 22 from the various sound detecting units 16, and from them produces a signal on a single wire 24 going to the computer 20, or through a modem and then to the computer 20.

In use, the hemispherical frame 10 shown in FIG. 1 would be mounted from 30 to 90 feet above the ground on a suitable tower. it has been found by experiment that with wind speeds below about 14 mph, none of the tubes 12 resonate and no sound is produced. From about 15 mph to about 30 mph, those tubes which are situated between about 90° and about 100° to the direction of wind movement will resonate and produce a sound. This means that, in the case of the distribution shown in FIG. 1, since all tubes have their axes passing through the hypothetical center 14 of the frame, a wind passing through the frame at between 15 and 30 mph in the direction of arrow 25 will cause sound to be generated in those tubes lying between a diametral plane at right angles to the wind direction (represented by line 17) and a parallel but non-diametral plane displaced the equivalent of 10° to the left of the first plane (represented by line 19). The tubes that are resonating will thus be on or within about 10° of a great circle of the hemispherical frame 10, i.e. a circle which is the curved line where the hemispherical surface meets the plane 17 passing through the center 14.

The computer 20 is programmed in such a way as to detect the positions of the resonating tubes, and from that information can determine the corresponding plane and the wind direction. At a speed range around 30 mph, the originally resonating tubes will lose the signal and will cease resonating. It is found that an adjacent circle of tubes then begins to resonate, namely tubes that are downwind of the original tubes. Each such downwind tube is angled slightly more toward the direction of the wind, and will lie on a plane somewhat further from the center of curvature 14 of the hemisphere. Thus, the subsequent tubes do not lie on or near a "great circle".

Experiment indicates that at a speed between 55 and 60 mph, this second ring of tubes again loses its signal, and resonance passes to a third ring of tubes still further around the curved surface, lying in a plane which is still further from the center of curvature 14 of the hemisphere. These tubes are thus even more angulated with their mouths opening toward the wind direction.

Yet another change takes place in the region of 80 to 90 mph, although this change is less distinct.

Attention is now directed to FIG. 3, which shows the various logic steps undertaken by the computer (referred to in the claims as "interpretative means". As can be seen, the computer sequentially samples the signals from all of the tube detecting units 16. If no signals are present (as a result of wind speeds being below 15 mph), the computer returns to the start and samples the signals again. If signals are present (as a result of wind speeds of 15 mph or greater), the computer determines the position and orientation of a hypothetical plane located such that the sum of the distances from all the signaling tubes to that hypothetical plane is the least. Looking at FIG. 1, it was indicated earlier that at wind speeds between 15 mph and 30 mph, the tubes located between a diametral plane 17 and a leftwardly displaced plane 19 would resonate. Thus, the computer would establish the hypothetical plane as lying somewhere between the plane 17 and 19. The computer then calculates the position and orientation of a perpendicular line dropped from the hemispherical center 14 to the hypothetical plane that it has just calculated. The horizontal projection of that perpendicular line is taken to be the compass direction of the wind. The inclination of that line to the horizontal is taken to be the wind inclination to the horizontal.

Finally, by calculating the length of the perpendicular line from the frame center 14 to the hypothetical plane, the computer can consult a table stored in memory to determine the wind speed range. Thus, the computer would be able to identify several speed ranges as previously described.

The computer then has the option of displaying and/or printing these various characteristics of the wind. Following the display or printing, the computer encounters an instruction to return to the start and run through the flow chart again.

It will thus be seen that the computer will be able to determine, by the configuration of the resonating tubes, both the compass direction and the shear effect (angular inclination to the horizontal) of the wind flow through the hemispherical frame 10. It will also be able to give a rough estimate of the wind speed on the basis of which ring is resonating.

It will be understood that there is no specific ring being indicated when mention here is made, for example, of the initial resonating tubes on or near a great circle. The orientation of that band of tubes is going to depend strictly on the wind direction and wind inclination. In the case where the wind has a strong component in the downward direction, for example, the band of initially resonating tubes will likewise be angulated with respect to the horizontal. Thus, the computer determines the position of the band in which the resonating tubes are found, determines geometrically how far away (if at all) that band (or plane) is from the center of curvature 14 of the hemisphere, and then on the basis of the angulation and compass orientation of the ring of resonating tubes, as well as its distance away from the center of curvature 14, the computer is enabled to determine the compass direction of the wind, the wind inclination (shear factor), and the approximate speed of the wind.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. Apparatus for determining wind characteristics, comprising:

frame means means defining a plurality of resonant chambers, each with a mouth opening such that wind blowing across the opening at an appropriate speed and direction causes air within the respective chamber to resonate and create a sound, the chambers and mouth openings being at different angles and orientations so as to correspond to hemispherical radii distributed at intervals no greater than about 10°, a sound detecting unit associated with each resonant chamber and producing a signal when its respective chamber is resonating, and interpretative means for continuously sampling the output from all said sound detecting units, and for calculating from said sampled outputs the compass direction, the inclination to the horizontal and the speed range of the wind.

2. The invention claimed in claim 1, in which the frame means is substantially in the form of a hemisphere, the resonant chambers being distributed around the hemispherical shape with their respective mouths all directed toward the hypothetical center of the hemispherical shape.

3. The invention claimed in claim 2, in which the resonant chambers are located on north-south meridians of the hemispherical shape.

4. The invention claimed in claim 2, in which the interpretative means includes a computer and a computer display.

5. The invention claimed in claim 2, in which the resonant chambers are defined by elongate tubes oriented so that the projected axes of all the tubes pass substantially through the hemispherical center, the mouths being constituted by open ends of the tubes, the tubes being closed at the ends opposite the mouths.

6. A method for determining wind characteristics, comprising the steps:
(a) providing an apparatus including:
frame means, and
means defining a plurality of resonant chambers, each with a mouth opening such that wind blowing across the opening at an appropriate speed and direction causes air within the respective chamber to resonate and create a sound, the chambers and mouth openings being at different angles and orientations so as to correspond to hemispherical radii distributed at intervals no greater than about 10°,
(b) placing the apparatus in a wind stream such that certain of the resonant chambers begin to resonate and create sound due to the passage of wind across the respective mouths at appropriate angles,
(c) detecting the generation of sound in the resonating chambers, and
(d) computing, on the basis of those chambers actually producing a signal, the position and orientation of a hypothetical plane located such that the sum of the distances of the plane from all signaling chambers is the least, and further calculating: (1) the compass direction of the wind as that of a perpendicular line from the center of the hypothetical hemisphere to the hypothetical plane, (2) the inclination of said line to a horizontal plane as the inclination of the wind to a horizontal plane, and (3) the wind speed range as a function of the perpendicular distance from the center of the hypothetical hemisphere to the hypothetical plane.

7. The invention claimed in claim 6, in which the frame means is substantially in the form of a hemisphere, the resonant chambers being distributed around the hemispherical shape with their respective mouths all directed toward the hypothetical center of the hemispherical shape.

8. The invention claimed in claim 7, in which step (d) further includes displaying the said at least one characteristic on a computer display.

9. The invention claimed in claim 2, in which the interpretative means calculates, on the basis of those units actually producing a signal, the position and orientation of a hypothetical plane located such that the sum of the distances of the plane from all signalling units is the least, said interpretative means further calculating (1) the compass direction of the wind as that of a perpendicular line from the hemispherical center to the hypothetical plane, (2) the inclination of said line to a horizontal plane as the inclination of the wind to a horizontal plane, and (3) the wind speed range as a function of the actual perpendicular distance from the hemispherical center to the hypothetical plane.

* * * * *